May 8, 1962  D. S. RATHJE  3,034,047
RESISTANCE WIRE TESTING METHOD AND APPARATUS
Filed Dec. 30, 1957

INVENTOR.
DAVID S. RATHJE

BY HIS ATTORNEYS.
HARRIS, KIECH, FOSTER & HARRIS

United States Patent Office 3,034,047
Patented May 8, 1962

3,034,047
RESISTANCE WIRE TESTING METHOD
AND APPARATUS
David S. Rathje, Culver City, Calif., assignor to Beckman Instrument, Inc., a corporation of California
Filed Dec. 30, 1957, Ser. No. 705,851
3 Claims. (Cl. 324—62)

This invention relates to method and apparatus for measuring the resistance linearity of wire. The invention is especially suitable for use in testing resistance wire for wire wound potentiometers and the like and will be described as applied thereto. However, the invention is adaptable for other applications and is not to be limited solely to the manufacture of potentiometers.

The linearity error of a potentiometer is produced by several factors including winding inaccuracies, tolerances on parts, and the errors in linearity of the resistance wire. Hence a knowledge of the linearity of the length of wire to be used in a particular potentiometer will provide an indication of the resultant linearity of the unit, and selection of a length of wire having a particular linearity enables production of potentiometers having related linearities. Ordinarily, of course, the selected length of wire would have a departure from linearity less than some predetermined value so that the completed potentiometer would meet a particular specification. It is accordingly an object of the invention to provide a method and apparatus for determining the resistance linearity of a spool of resistance wire which can be carried out continuously and at a high rate in production quantities.

It is an object of the invention to provide a method of determining linearity in which a very small segment of a large piece of wire is compared with a standard in a bridge or the like while the wire is continuously driven past the measuring zone with the resistance difference being integrated relative to the movement of the wire producing an output suitable for recording which indicates resistance deviation versus position along the wire. A further object is to provide such a method in which the linearity of a particular length of the spool of wire can be provided by locating the particular length of the record, laying out the mean slope of the recorded deviation for this length, and measuring the maximum recorded deviation from the mean slope.

It is another object of the invention to provide a resistance wire linearity tester having drive means for passing a wire past a spaced set of contacts which connect a short portion of the wire into a bridge circuit with a servo driven null system for maintaining the bridge balanced so that the output of the servo system is a function of the linearity of the wire passing the bridge circuit. A further object of the invention is to provide such an apparatus in which the output of the servo system is integrated relative to the motion of the wire past the bridge circuit providing an output suitable for recording as resistance deviation versus position along the wire. A still further object of the invention is to provide such an apparatus utilizing a ball and disc integrator in which the motion of the wire is coupled to the rotating disc and the output of the servo system is coupled to the translating balls.

It is another object of the invention to provide a resistance wire linearity tester requiring only a very short length of resistance wire in the bridge circuit. A further object is to provide such a device which utilizes a Kelvin double bridge with two moving contacts at each end of the section of wire in the bridge which arrangement substantially eliminates the effect of contact resistances.

The apparatus of the invention contemplates a continuously moving wire with contacts for interconnecting a portion of the wire into a bridge circuit with a servo null system for continuously keeping the bridge balanced. The wire drive and the servo system are coupled to an integrator which integrates bridge output with respect to wire motion providing a record of resistance deviation versus position along the wire for determination of the linearity of particular lengths of the wire.

The invention also comprises novel details of construction and novel combinations and arrangements of parts, which will more fully appear in the course of the following description.

The drawing merely shows and the description merely describes a preferred embodiment of the present invention which is given by way of illustration or example.

Figure 1:
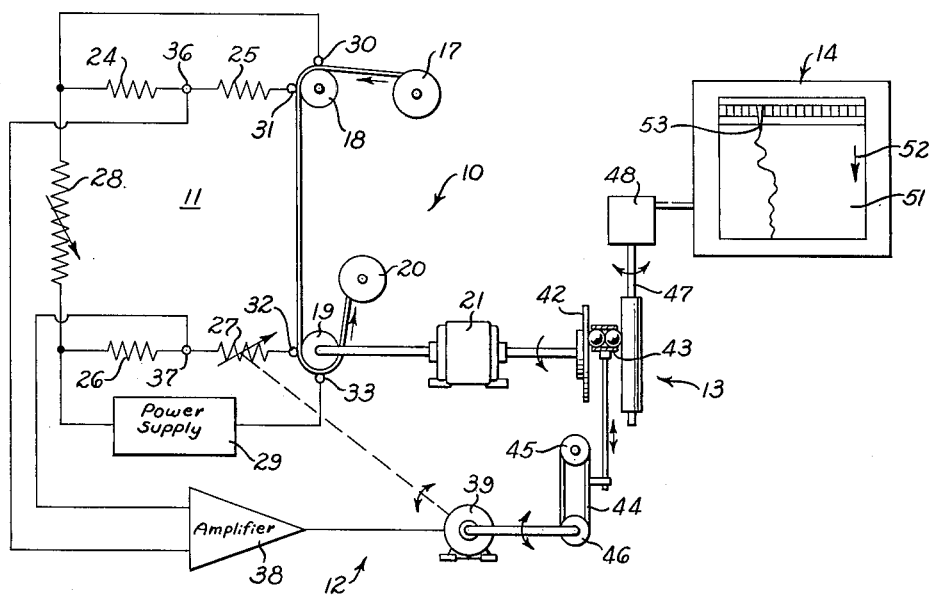
FIG. 1 is a schematic diagram of a preferred embodiment of the invention.

The apparatus of FIG. 1 includes a wire drive 10, a bridge circuit 11, a servo balance system 12, an integrating unit 13, and a recorder 14. The wire drive 10 includes a wire take-off reel 17, a first roll 18, a second roll 19, a wire take-up reel 20, and a drive motor 21. The motor 21 continuously drives the wire from the take-off reel or spool 17, over the rolls 18, 19, and onto the take-up reel 20. It is desirable, although not necessary, that the motor run at an approximately constant speed, which speed is suitable for the wire being tested.

The bridge circuit 11 includes moving contacts for connecting that portion of the wire between the rolls 18, 19 into the bridge circuit. Such moving contacts introduce a problem of high and variable contact resistance and it has been found that the use of a Kelvin double bridge in the bridge circuit of the invention substantially eliminates adverse effects due to contact resistance. The bridge circuit 11 includes fixed resistors 24, 25, 26, variable resistors 27, 28, a power supply 29, and moving contacts 30, 31, 32, 33, the wire being tested moving over the rolls 18, 19 past the contacts 30–33. The resistor 28 is the standard resistor to which the magnitude of the resistance of the wire between the moving contacts 31 and 32 is compared by the operation of the bridge. This resistor will be set at the beginning of the test run for the particular type of wire being tested. The resistors 24, 25 are ordinarily equal in value and then the resistance of the portion of wire between the rolls is equal to the resistances of 28 multiplied by 27 and divided by 26.

The output of the bridge circuit is developed at terminals 36, 37, which output is connected as the input to a null amplifier 38 of the servo balance system 12. The null amplifier drives a servo motor 39 which mechanically drives the variable resistor 27 for continuously balancing the bridge to provide a null output as the wire is passed through the bridge.

The integrating unit 13 integrates the output of the servo motor 39 relative to the output of the drive motor 21 or, stated in other terms, the integrating unit integrates the rate of deviation of the resistance of the portion of the wire between the contacts 31 and 32 from the standard resistance 28 over the length of the wire. In its preferred form the integrating unit 13 comprises a ball and disc integrator in which the rotating disc 42 is driven by the drive motor 21 and the ball carriage 43 is translated by the servo motor 39, the rotation of the servo motor shaft being converted to linear motion by a belt 44 and pulleys 45, 46, the latter being driven by the servo motor. The output of the integrating unit appears as rotation of the shaft 47, this mechanical output being converted to an electrical signal by potentiometer 48 for driving the recorder 14.

Figure 2:
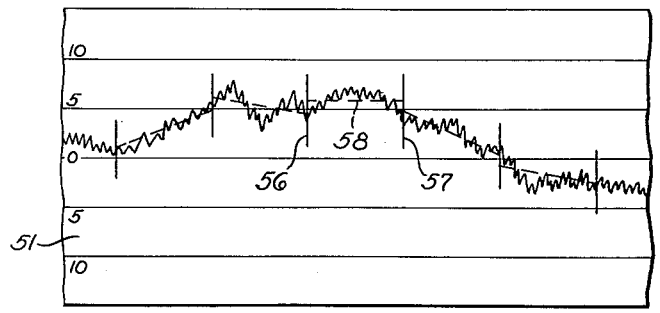
FIG. 2 shows a portion of a record produced by the apparatus of FIG. 1.

The recorder 14 produces a plot of integrator output versus position along the wire. In the recorder 14, a strip of chart paper 51 is driven in the direction of the arrow 52 and a marking stylus 53 is deflected laterally as a function of the integrator output. Correlation between the portion of the wire being tested and the position on the record may be maintained by driving the recorder and the wire at fixed relative speeds or by driving the recorder from the wire drive motor. FIG. 2 is an enlarged view of a strip of chart paper from the recorder with the output being the irregular solid line.

The linearity error of a length of wire at a particular point along the wire is the amount of deviation of the actual resistance from the ideal resistance expressed as a percentage of the total resistance of the length of wire. It can be shown that this linearity error is proportional to the integral of the rate of deviation of actual resistance of the test segment of wire from the standard resistance. The bridge circuit 11 compares the actual resistance of the segment of wire in the test zone between the contacts 31 and 32 to the resistance of the standard resistor 28. When the bridge is operated as a self-balancing null indicator, as described above, the output appearing at the servo shaft is proportional to the rate of deviation of the resistance in the test zone from the standard resistance, which is the slope of the linearity error curve. The output of the bridge, i.e., the deviation rate, is integrated with respect to the movement of wire through the bridge to provide the recorded output which is directly proportional to the linearity error.

When a spool of wire is tested in the apparatus of the invention, a chart, of which FIG. 2 is a portion, is obtained. In order to determine the linearity of a particular length of wire on the spool of wire, that portion of the record corresponding to the length of wire being considered is marked off, the main slope line of this section of the record is determined, and the maximum resistance deviation from this mean slope line is measured. This maximum deviation is directly proportional to the linearity error and can be calibrated in terms of resistance or percent linearity.

As an example, a particular length of wire is indicated by the vertical lines 56, 57 on the curve of FIG. 2. The dashed line 58 represents the best straight line approximation of that portion of the curve between the lines 56 and 57, this dashed line being the mean slope line of the linearity curve. The maximum deviation of the curve from the mean slope line 58 represents the maximum linearity error of the particular length of wire positioned between the lines 56, 57.

The method and apparatus of the invention provides for high speed and continuous handling of spools of resistance wire and provides immediate measurement of the linearity of the entire spool as well as of any particular lengths of wire on the spool. An apparatus built and operated in accordance with the invention using a test zone twenty four inches in length provides a measure of linearity error as small as 0.01 percent to an accuracy of ±0.0025 percent, based on a wire length of 123 feet. The accuracy increases with larger wire lengths.

Although an exemplary embodiment of the invention has been disclosed and discussed, it will be understood that other applications of the invention are possible and that the embodiment disclosed may be subjected to various changes, modifications and substitutions without necessarily departing from the spirit of the invention.

I claim as my invention:

1. In a resistance wire linearity tester, the combination of: a wire drive including two spaced rolls and means for passing a wire over said rolls; a Kelvin double bridge circuit including two pairs of contacts for electrically connecting the length of wire between said rolls into said bridge circuit as an element thereof, a pair of said contacts being positioned at each of said rolls, said bridge circuit including a variable resistor, the output of said bridge circuit being a function of the resistance of the length of wire positioned between said pairs of contacts and the resistance of said variable resistor; a servo balance system including a null amplifier driven by said output of said bridge circuit and a servo motor driven by said amplifier for maintaining said bridge circuit balanced, said servo motor being coupled to said variable resistor in driving relationship; an integrator having two inputs driven by said wire drive and said servo motor, respectively, providing an output which is the integral of the rate of deviation of wire resistance from linearity over the length of the wire, and means for recording the output of said integrator.

2. A method of determining the resistance linearity of a length of wire which is a portion of a much larger piece of wire, including the steps of: connecting a zone of the wire as the unknown leg of a Kelvin double bridge circuit to determine very precisely the deviation of the resistance of the zone from a standard resistance comprising another leg of said bridge; continuously moving the zone along the wire, the zone being of constant size and very short relative to said length of wire; producing a first variable output which is directly proportional to the movement of the zone along the wire; producing a second variable output which is directly proportional to the instantaneous deviation of the resistance of the zone from that of the standard; integrating the second output with respect to the first output as the zone is moved along the wire; recording the integration resultant versus position of the zone along the piece of wire; ascertaining the mean slope of that portion of the record corresponding to said length of wire; and measuring the maximum deviation of said portion of the record from said mean slope as a measure of the maximum departure from linearity of said length of wire.

3. In a resistance wire linearity tester, the combination of: drive means for passing a wire past a pair of points; means for precisely measuring the deviation of the resistance of the portion of the wire between said points from a standard resistance comprising a Kelvin double bridge circuit including means for coupling that portion of the wire between said points into said bridge circuit as an element thereof with two contacts at each of said points, said bridge circuit including legs composed of said standard resistance and a variable element; a servo balance system including a null amplifier; means for connecting the output of said bridge circuit to said servo balance system in driving relationship; means for integrating the rate of deviation of the resistance of the portion of wire between said points from said standard resistance comprising an integrating unit having two variable inputs and an output; means for coupling said drive means to one of said integrating unit inputs for varying said one input as a function of the rate of travel of the wire past said pair of points; said servo balance system having means for coupling the output of said null amplifier to said variable element for varying the magnitude thereof and maintaining said bridge circuit balanced and to the other of said integrating unit inputs for varying said other input as a function of the deviation of the resistance of that portion of the wire between said points from a predetermined resistance value; and means coupled to the output of said integrating means for recording the output thereof as a function of the position of the wire.

References Cited in the file of this patent
UNITED STATES PATENTS

| | | |
|---|---|---|
| 2,139,474 | Shepard | Dec. 6, 1938 |
| 2,433,006 | Weiss | Dec. 23, 1947 |
| 2,545,576 | Godley | Mar. 20, 1951 |
| 2,641,960 | Strother | Jan. 16, 1953 |
| 2,699,701 | Strother et al. | Jan. 18, 1955 |
| 2,714,328 | Hamburger et al. | Aug. 2, 1955 |
| 2,782,368 | McCarthy | Feb. 19, 1957 |

UNITED STATES PATENT OFFICE
CERTIFICATE OF CORRECTION

Patent No. 3,034,047                     May 8, 1962

David S. Rathje

It is hereby certified that error appears in the above numbered patent requiring correction and that the said Letters Patent should read as corrected below.

Column 4, line 3, for "paris" read -- pairs --; line 13, after "wire" insert a semi-colon --.

Signed and sealed this 28th day of August 1962.

(SEAL)
Attest:

ESTON G. JOHNSON
Attesting Officer

DAVID L. LADD
Commissioner of Patents